United States Patent [19]

Lockwood

[11] Patent Number: 5,532,700
[45] Date of Patent: Jul. 2, 1996

[54] PREPROCESSOR AND ADAPTIVE BEAMFORMER FOR ACTIVE SIGNALS OF ARBITRARY WAVEFORM

[75] Inventor: James C. Lockwood, San Diego, Calif.

[73] Assignee: The United States of America as represented by the Secretary of the Navy, Washington, D.C.

[21] Appl. No.: 405,487

[22] Filed: Mar. 16, 1995

[51] Int. Cl.⁶ .............................. G01S 3/16; G01S 15/00
[52] U.S. Cl. ............................................ 342/378; 367/103
[58] Field of Search ................................. 342/375, 378, 342/379, 380, 382, 383; 367/103

[56] References Cited

U.S. PATENT DOCUMENTS

| | | |
|---|---|---|
| 3,763,490 | 10/1973 | Hadley et al. . |
| 4,169,257 | 9/1979 | Smith . |
| 4,320,400 | 3/1982 | Chasek ................................. 342/378 |
| 4,513,385 | 2/1985 | Muri ..................................... 364/572 |
| 4,559,605 | 12/1985 | Norsworthy . |
| 4,796,236 | 1/1989 | Welles, II et al. . |
| 4,849,945 | 7/1989 | Widrow . |
| 5,117,238 | 5/1992 | Silverstein et al. . |
| 5,150,336 | 9/1992 | Sullivan et al. . |
| 5,228,006 | 7/1993 | Sheriff . |
| 5,228,007 | 7/1993 | Murakami et al. . |
| 5,251,186 | 10/1993 | Lockwood . |

OTHER PUBLICATIONS

"The use of Fast Fourier Transform for the Estimation of Power Spectra: A Method Based on Time Averaging Over Short, Modified Periodograms", *IEEE Transactions on Audio Electroacoustics*, vol. AU–15, No. 2, pp. 70–73 by Peter D. Welch.

"Robust Adaptive Beamforming", *IEEE Trans on Acoustics, Speech and Signal Processing*, vol. 35, pp. 1365–1376 (1987) by Cox, Zeskind and Owen.

"Adaptive Beamforming for Coherent Signals and Interference", *IEEE Transactions on Acoustics, Speech and Signal Processing*, vol. ASSP–33, No. 3, Jun. 1985 by Shan and Kailath.

*Primary Examiner*—Gregory C. Issing
*Attorney, Agent, or Firm*—Harvey Fendelman; Michael A. Kagan; Eric James Whitesell

[57] ABSTRACT

A pre-processor and adaptive beamformer processes an echo received by an array of receiving elements from a distant target from a transmitted signal having an arbitrary waveform capable of being represented as a complex modulation of a carrier frequency. Time blocks are formed from each element output represented by a series of time windows extending from an initial time appropriate to the arrival time of the echo to a final time appropriate to the time block. A correlation is performed of each time block with a replica of the transmitted signal. The correlation products are aligned with respect to time difference to within one sample period. The beamformer further aligns the correlation products with respect to time difference to substantially the same phase for each steering direction. Covariance estimates are formed using techniques of spatial averaging to generate adaptive weights optimized to suppress interfering signals without requiring the use of time averaging.

27 Claims, 6 Drawing Sheets

PREPROCESSOR AND ADAPTIVE BEAMFORMER FOR ACTIVE SIGNALS OF ARBITRARY WAVEFORM

BACKGROUND OF THE INVENTION

The present invention relates to preprocessing and adaptively beamforming an echo of a transmitted signal received by an array of receiving elements. More specifically, but without limitation thereto, the present invention relates to adaptively masking interfering signals in the sidelobe responses of a beamformer having the same range resolution interval as the echo.

Many varieties of signal waveforms have applications in active sonar and radar. Active sonar and radar beamformers form sums of weighted element outputs from receiving arrays to find the range, speed, and bearing of distant objects. Adaptive beamforming has been applied to active signals, although it is more commonly used in passive receiving applications to modify weights of receiving elements to improve coherent beam output.

Previous methods for adaptive beamforming use a block size of input samples spanning at least twice the transition time required for a signal to traverse the entire array of receiving elements. This transition time may be much greater than the inherent time resolution of the waveform, which is the reciprocal of the signal bandwidth. In active adaptive beamforming, weights are derived to mask interfering signals in sidelobe responses having the same range resolution interval or cell as the signal source.

However, a problem arises in that these sources of interference may be miles away from the signal source, as the input samples must be taken over an interval long enough for the signal to pass all the elements of the receiving array. Consequently, the block size of the input samples prevents the use of local parameters for adaptive beamforming close to the range of the target.

Another problem is that waveforms with a large time-bandwidth product must be subjected to some type of pulse compression, such as correlation processing, to achieve a time resolution of the order of the reciprocal of the bandwidth. Prior to pulse compression, however, every sample of the received signal may contain interfering echoes along the entire pulse length, which may be much greater than the reciprocal of the bandwidth. Pulse compression thus also prevents using local parameters for adaptive beamforming, unless it is done prior to the beamforming step.

A solution to these interference problems for linear frequency modulated signal waveforms is described in "PREPROCESSOR AND ADAPTIVE BEAMFORMER FOR LINEAR-FREQUENCY MODULATION ACTIVE SIGNALS," U.S. Pat. No. 5,251,186 (1993), hereafter referred to as the '186 patent. However, there remains a need to solve these interference problems for signals of other waveform types, such as linear-period FM, hyperbolic FM, and pseudo-random noise. The present invention is directed to this need and may provide further related advantages.

SUMMARY OF THE INVENTION

The embodiment described below of a preprocessor and adaptive beamformer for active signals of arbitrary waveform does not preclude other embodiments and advantages of the present invention that may exist or become obvious to those skilled in the art.

An array of receiving elements receives a transmitted signal of arbitrary waveform capable of being represented as a complex modulation of a carrier frequency. The element outputs are digitized to form a complex digital time series. A plurality of uncompressed time blocks are formed from the complex digital time series. Each uncompressed time block contains sufficient data to time-align a time segment of each complex digital time series and to correlate a time window with a replica of the transmitted signal. The correlation products are time shifted to form time-aligned groups aligned with respect to time difference to within one sample period for each steering direction. The time-aligned groups are time windowed to form a series of time windows. Each time window extends from an initial time appropriate to an arrival time of an echo from the transmitted signal to a final time appropriate to the time duration of the echo.

The beamformer phase shifts the time windows to further align with respect to time differences of less than a sample period to form a phase-aligned complex time series. A summed beam output is formed from the phase-aligned complex time series for each steering direction.

A covariance estimate may be generated by spatial averaging element output covariance samples from a plurality of subarrays formed from the array of receiving elements. Adaptive weight vectors may be formed from the covariance estimate for suppressing interfering signals by minimizing element output power. The adapted weight vectors are multiplied by the element outputs corresponding to each time segment, respectively, to form a complex series of inner products. The complex series of inner products are averaged to form the summed beam output.

An advantage of the present invention is that parameters used for adaptive beamforming are not limited by array length. For a line array, the present invention uses parameters extremely localized with respect to range regardless of array length.

Another advantage is that parameters used for adaptive beamforming are not limited by pulse compression. Pulse compression is performed prior to beamforming by correlating the element outputs with a replica of the transmitted signal.

A further advantage is that any transmitted waveform capable of being represented in a time shifted form as a product of a complex multiplication may be processed by the present invention.

Still another advantage is that more precise localization parameters may be used to process broadband active signals.

Yet another advantage of the present invention is that pre-processed output time block size is not dependent upon number of receiving elements.

Another advantage of the present invention is that highly localized parameters may be used to estimate average covariance for adaptive beamforming.

A further advantage of the present invention is that spatial averaging for estimating average covariance may be used to suppress interfering signals.

Still another advantage of the present invention is that adaptive beamforming weights may be generated from average covariance estimates derived from data parameters that are highly localized with respect to time resolution cells within discrete time windows of the element outputs.

The features and advantages summarized above in addition to other aspects of the present invention will become more apparent from the description, presented in conjunction with the following drawings.

DESCRIPTION OF AN EMBODIMENT OF THE INVENTION

The following description is presented solely for the purpose of disclosing how the present invention may be made and used. The scope of the invention is defined by the claims.

Figure 1:
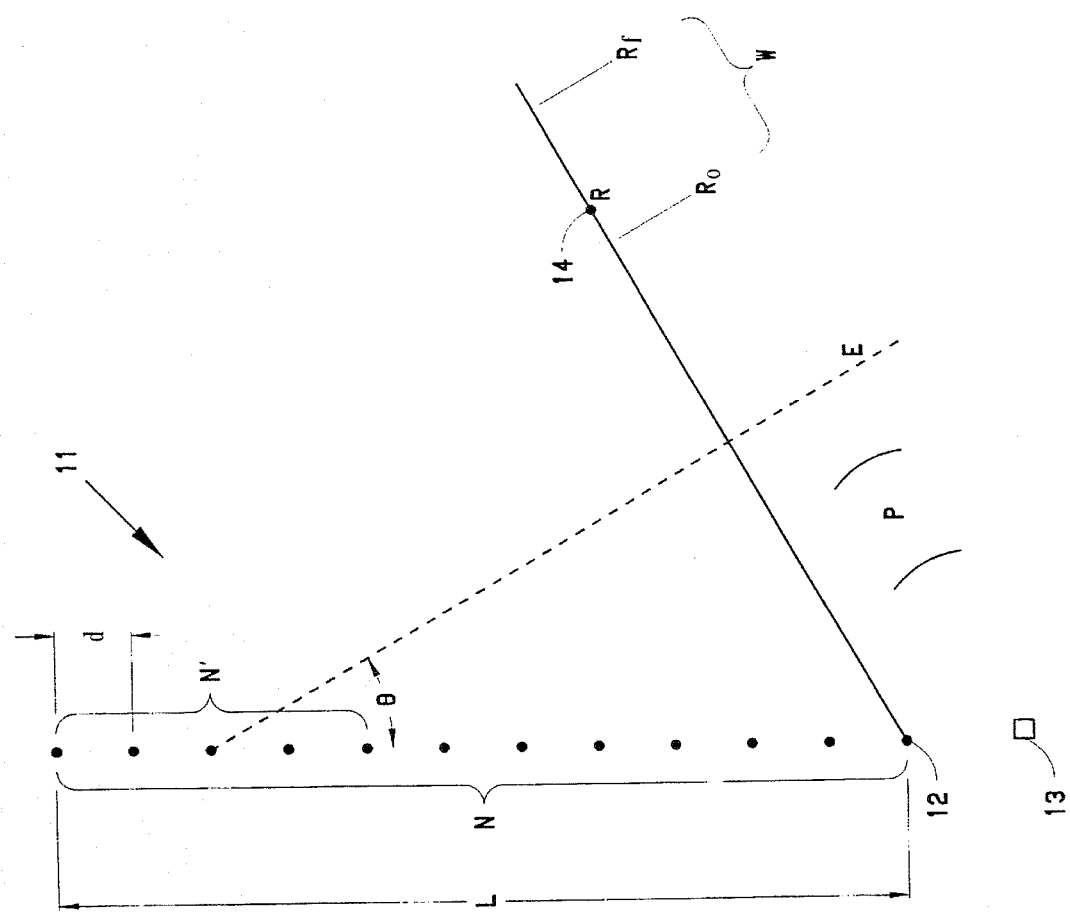
FIG. 1 is a diagram of a line array of receiving elements (hydrophones), a transmitter, and a target.

In the diagram of FIG. 1, a line array 11 of receiving elements N has an element spacing d. Element spacing d is preferably equal to or less than a half wavelength of the highest frequency of a signal pulse P reflected from a target 14 at a range R from a first element 12 of receiving array 11. Any other suitable spacing of receiving elements N may also be used. The invention is suitable for radar or sonar receiving elements, and receiving elements N may be equally or unequally spaced. Other geometries than line array 11 of receiving elements N may be used, for example, a planar array or a volumetric array. Volumetric arrays may have a cylindrical, spherical, or other geometry suitable for an intended application.

Referring to FIG. 1, element spacing d should be appropriate for defining several identical, highly overlapped subarrays such as N' for best adaptive beamforming performance if spatial averaging is used to estimate covariance. Line array 11 may be mounted or deployed by any appropriate means, and signal pulse P may be transmitted from any position compatible with the reception of a plane wave echo E from target 14, for example by a transmitter 13 near a first element 12. Echo E from target 14 intersects line array 11 at an angle θ. Angle θ would be equal to zero if target 14 was broadside to line array 11.

When echo E is correlated with a replica of signal pulse P, a correlation peak occurs within a time window W corresponding to range R of target 14. Time window W may also contain echoes from range $R_0$ to range $R_f$, where $R_0$ is an initial range from first element 12 corresponding to time $T_0$. Time window W has a duration T that is preferably equal to or less than the duration of a replica correlation of signal pulse P in FIG. 1. having an output time series of length $T_c$, which exceeds a duration of time $T_L$ for a signal to traverse line array 11. Duration T is related to range interval $R_f - R_0$ by $$T = 2(R_f - R_0)/c,$$

where c=speed of sound in water. Time window W augmented by Tn defines a time block having a duration preferably less than or equal to $T_c$ beginning at a time at or before signal pulse P travels to and returns from a range $R_0 - L/2$ and ending at a time at or after signal pulse P travels to and returns from a range $R_f + L/2$, where L is array length. Each time block is preprocessed by replica correlation for each steering direction, and a time window W is selected corresponding to the range from $R_0$ to $R_f$ from each receiving element time block output.

Each time window W in FIG. 1 may be stepped in contiguous increments to include a desired range extent in which to detect target 14. An example of time windowing is illustrated in an article entitled "The use of Fast Fourier Transform for the Estimation of Power Spectra: A Method Based on Time Averaging Over Short, Modified Periodograms", *IEEE Transactions on Audio Electroacoustics*, Vol AU-15, No. 2, pages 70–73 by Peter D. Welch. This article is incorporated herein by reference thereto.

If time window W shown in FIG. 1 is T seconds in length, the range width of the window is T/2 times the speed of sound c to account for round trip time of signal pulse P. The time duration of a time resolution cell $T_p$ is the reciprocal of the bandwidth of signal pulse P. Accordingly, if signal pulse P has a bandwidth of 100 HZ, then time resolution cell $T_p$ is 1/100th of a second long. If T equals one second, for instance, there would then be 100 time resolution cells in time window W of FIG. 1. A range resolution cell having a range width of c/2 B thus corresponds to a time resolution cell having a time width of 1/B. If range R of target 14 is unknown, time window W is stepped in contiguous increments until a peak correlation occurs in a time resolution cell of time window W with a replica of signal pulse P. A correlation of an analytic (complex) time series representing a time block within time window W having only phase and amplitude differences and a time delay within time window W between echo E and a replica of the transmitted signal realizes data parameters especially well conditioned for beamforming as described herein. These data parameters are especially important for determining element weights in an adaptive beamformer. In the adaptive beamformer, a covariance estimate formed from the data parameters localizes the processing to a single time cell to exclude interfering signals from ranges outside time window W.

Referring to FIG. 1, if the arrival time of echo E from range $R_0$ at first element 12 is zero, then the arrival time of echo E from target 14 at range R is $$T_1 = 2(R - R_0)/c,$$

where c=speed of sound in water.

The arrival time of echo E from (R,θ) at the nth element of line array 11 may be given by $T_n = T_1 - (n-1)d/c \sin θ$, where n=relative element position, d=spacing between elements, and θ=angle of incidence of echo E.

Figure 2:
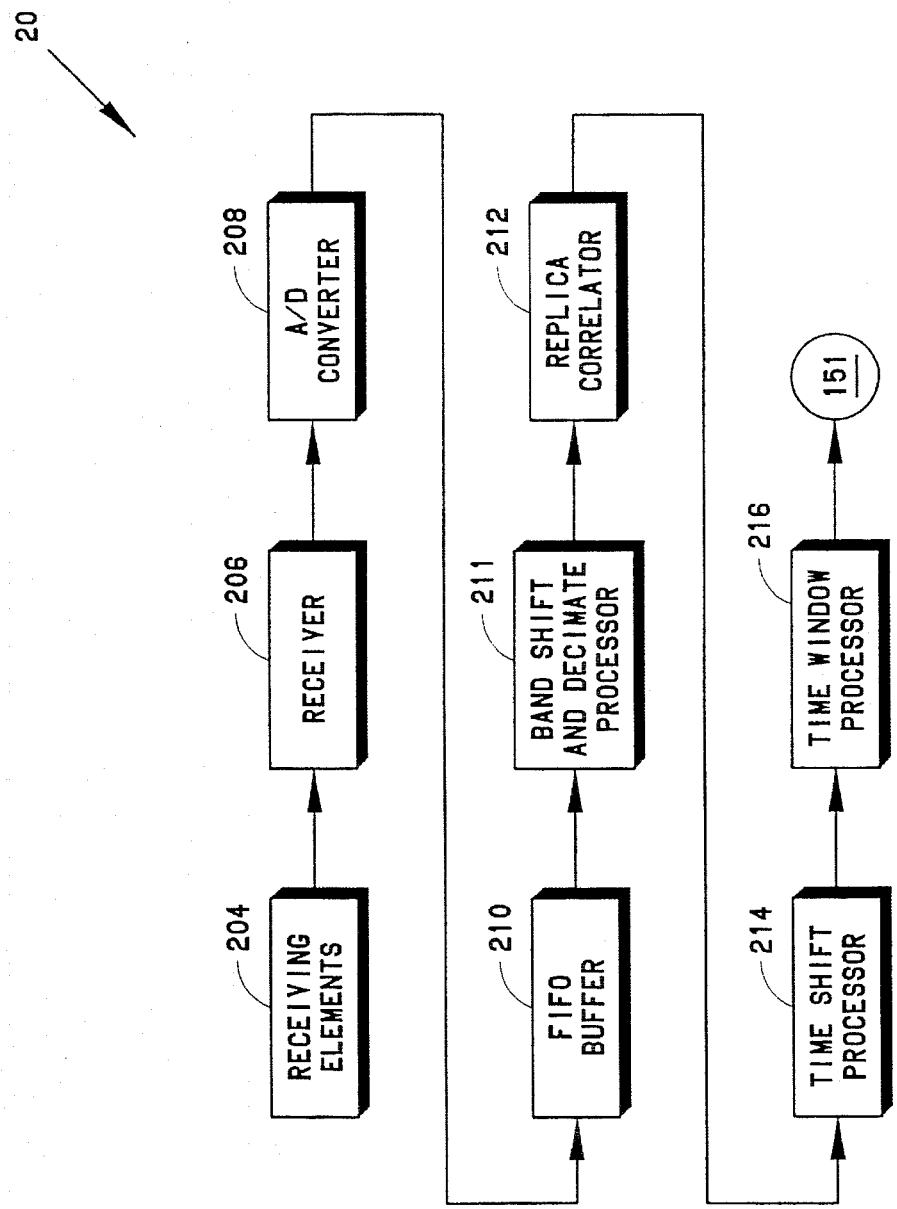
FIG. 2 is a block diagram of a pre-processor of the present invention.

An example of a pre-processor 20 of the present invention shown in FIG. 2 comprises an array of receiving elements 204 and a receiver 206 for receiving outputs from receiving elements 204. An A/D converter 208 digitizes the element outputs received by receiver 206. A/D converter 208 samples output data at Nyquist rate or higher to generate a time series of digital data $f_n(t_k)$. A FIFO (first in first out) buffer 210 receives digital data $f_n(t_k)$ from A/D converter 208 and outputs blocks of data corresponding to a series of overlapped time blocks of length 2 T, each time block having an initial time $T_0 - T_L$. Each time block corresponds to a partial element output $f'_n(t_k)$. Partial element output $f'_n(t_k)$ spans a time period preferably less than the total time of digital data $f_n(t_k)$. A band shift and decimate processor 211 receives digital data from FIFO buffer 210, converts the real time series $f'_n(t_k)$ to analytic complex form, shifts the signal bandwidth down in frequency and decimates the sample rate down to the Nyquist rate appropriate to the highest frequency of the shifted spectrum to generate an analytic time series $s_n(t_k)$.

A replica correlator 212 correlates the blocks of data output from FIFO buffer 210 with a replica of the transmitted signal to form a series of correlated time blocks. Because relative delays among receiving elements N result in target 14 having different time shifts which may be many time cells apart, each correlation product $C_n(t_k)$ must be aligned with respect to time difference for each steering direction prior to beamforming. Each correlation product $C_n(t_k)$ is accordingly time shifted by a time shift processor 214 for each steering direction. The correlated time blocks are then aligned with respect to time difference to within one sample period by time shift processor 214 to form a series of time-aligned groups for each steering direction.

A time window processor 216 forms a contiguous series of time windows from the series of time-aligned groups. Each time window extends from an initial time $T_0$ corresponding to the arrival time of an echo of the transmitted signal to a final time $T_f$ corresponding to the arrival time of a later echo.

Figure 3:
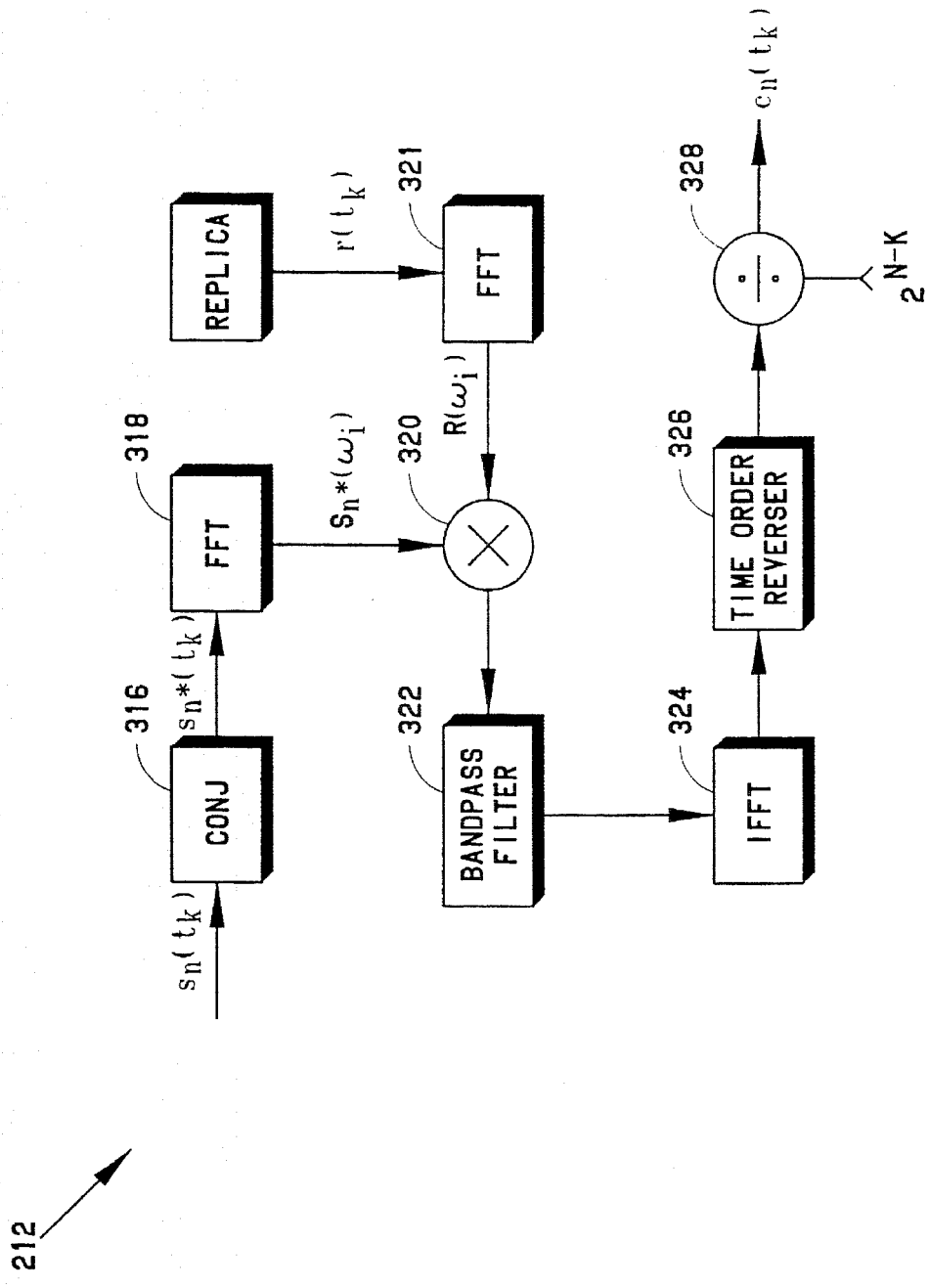
FIG. 3 is a block diagram of an implementation of a replica correlator.

FIG. 3 shows an example of an implementation of the replica correlator 212 of pre-processor 20 in FIG. 2. A conjugate processor 316 receives analytic time series $s_n(t_k)$ from band shift and decimate processor 211 and forms a complex conjugate time series $s_n^*(t_k)$.

A first FFT processor 318 receives complex conjugate time series $s_n^*(t_k)$ from conjugate processor 316 and produces a complex conjugate frequency series $S_n^*(\omega_i)$.

A second FFT processor 321 transforms a complex time series of a replica of the transmitted signal $r(t_k)$ to a complex frequency series $R(\omega_i)$. A multiplier 320 receives complex frequency series $R(\omega_i)$ and complex conjugate frequency series $S_n^*(\omega_i)$ and forms a product which is the Fourier transform of a time convolution, yielding the correlation products for each sample period in reverse time order A bandpass filter 322 receives the product of multiplier 320 and outputs in-band frequency components of the transmitted signal, removing out-of-band frequency components. The resulting complex frequency series is received by an inverse FFT processor 324 and output as a complex time series which is the time convolution sampled at a lower rate determined by the pass band of bandpass filter 322.

A time order reverser 326 receives the complex time series of inverse FFT processor 324 and outputs a complex time series in restored time order. A divider 328 receives the complex time series of time reverser 326 and corrects the magnitudes of the samples to compensate for a change in data normalization caused by a reduction in block size from bandpass filter 322. The resulting complex time series is output as a correlation product $c_n(t_k)$, which is the replica correlation of partial element output $f'_n(t_k)$ with the transmitted signal.

Other arrangements of the pre-processor are possible, for example, the time order could have also been reversed by moving conjugate processor 316 to the output of multiplier 320 and later changing the sign of the beamformer phase corrections, thus eliminating time order reverser 326.

For explanatory purposes, the processing of only one partial element output $f'_n(t_k)$ is shown in FIG. 3 and described herein. However, all partial element outputs $f'_n(t_k)$ over elements n from 1 to N may be processed concurrently in similar fashion. Accordingly, while a single set of components is shown in FIG. 3 for processing one partial element output $f'_n(t_k)$, there are actually N such sets of components for processing partial element outputs $f'_n(t_k)$ in time window W. With such an arrangement, partial element outputs $f'_n(t_k)$ of each time window W may be processed concurrently.

Figure 4:
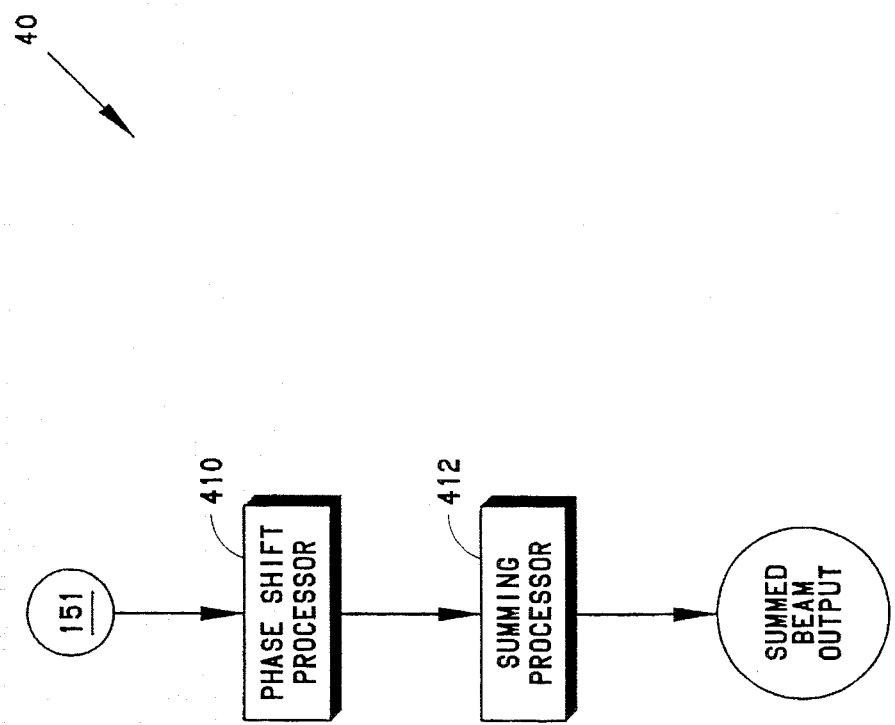
FIG. 4 is a block diagram of a beamformer of the present invention.

Referring now to FIG. 4, a beamformer 40 is shown having a phase shift processor 410 to further time-align correlation products $c_n(t_k)$. This is done to compensate for differences in time of less than one sample period, forming a phase-aligned complex time series. A summing processor 412 forms a summed beam output from the phase-aligned complex time series output from phase shift processor 410.

In a conventional beamformer, phase shift processor 410 multiplies each partial correlation product $c'_n(t_k)$ by $\exp[-i\Phi(\tau_n)]$, where $\omega(\tau_n)$ is the phase of an echo received from direction $\theta_v$ at the nth element displaced a small time $\tau_n$ from the nearest preceding time sample at $t_k$. For explanatory purposes, only one time resolution cell $t_k$ of equal k for the partial correlation products $c'_n(t_k)$ of a particular steering direction $\theta_v$ are shown and described herein. Accordingly, phase shift processor 410 forms correlation products $c'_n(t_k)$ for each sample time $t_k$ of equal k for all time intervals k for all elements n for each steering direction $\theta_v$. Partial correlation products $c'_n(t_k)$ of equal k are input respectively to summing processor 412 to produce phase aligned summed beam outputs $a_v(t_k, \theta_v)$ for all time resolution cells $t_k$ for all steering directions $\theta_v$. A beam output series $a(t_k, \theta_v)$ may be defined by a vector $V_v(t_k, \theta_v, \phi_k)$ having components $c'_n(t_k)$, where $$a(t_k, \theta_v) = S_v \cdot V_v,$$

S being a steering vector having components $$s_n = \exp i\Phi(\tau_n),$$

and where $\tau_n$ is the fractional part of
$T_n/\Delta t$, where
$T_n = T_1 - (n-1)d/c \sin \theta_v,$ and
$\Delta t = t_{k+1} - t_k.$ The function $\phi(\tau_n)$ is representation of the phase variation of echo E within a sample interval derived from the autocorrelation function of signal pulse P.

Figure 5:
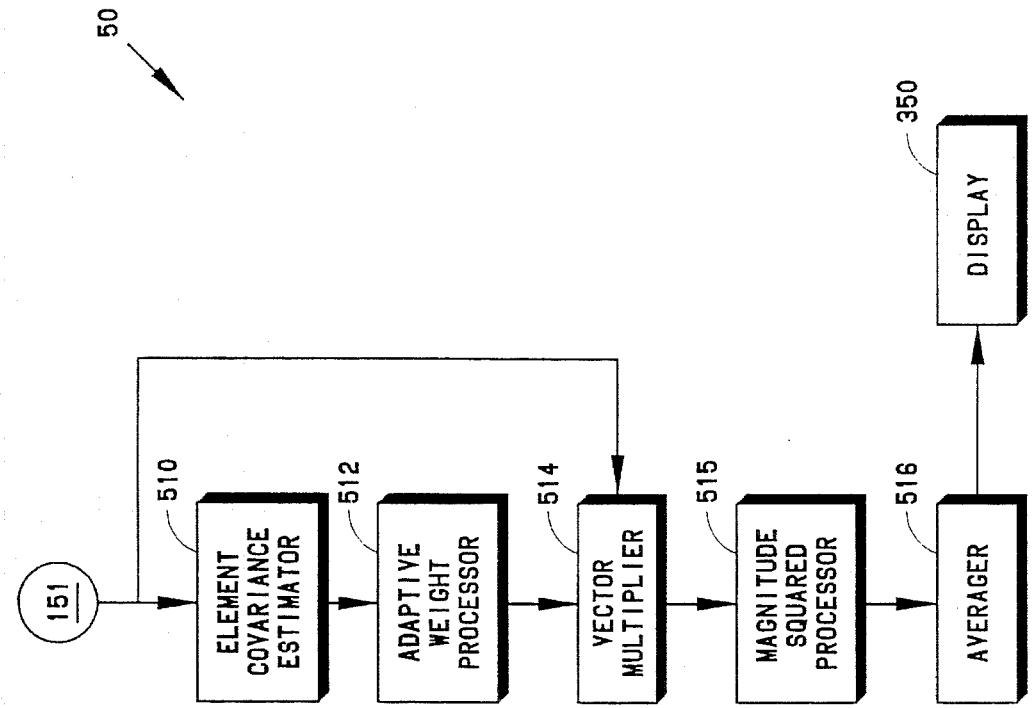
FIG. 5 is a block diagram of an adaptive beamformer of the present invention with element covariance estimation.

Beamformer 40 may be replaced by an adaptive beamformer 50 that is implemented with a structure similar to beamformer 40 except that adaptive weights are formed to optimize the summed beam output as shown in FIG. 5.

In FIG. 5, a covariance estimator 510 receives the contiguous time series output from time window processor 216 in FIG. 2 and generates an element covariance matrix $C_m$ from a number of highly overlapped subarrays of receiving elements N. Covariance matrix $C_m$ is used to generate a covariance estimate according to $$\bar{C} = \frac{1}{M} \sum_{m=0}^{M-1} C_m$$

where
  C=covariance estimate,
  m=subarray index, and
  M=number of overlapped subarrays.

An adaptive weight processor 512 generates adaptive weight vectors W for each steering direction v to minimize element output power according to $$P_{ME} = W^H \bar{C} W,$$

subject to a look constraint that the signal gain in the steering direction v is unity according to $$W^H S = 1$$

such that $$W = \frac{\bar{C}^{-1} S}{S^H \bar{C}^{-1} S}.$$

By way of example, a single constraint is used. Multiple constraints exist in the literature and may be substituted, if desired. Examples of multiple constraints are described in "Robust Adaptive Beamforming", *IEEE Trans on Acoustics, Speech and Signal Processing*, Vol 35, pages 1365–1376 (1987) by Cox, Zeskind and Owen. This article is incorporated herein by reference thereto.

A vector multiplier 514 applies adapted weight vectors W for all steering directions $\theta_v$ to respective subarray output vectors $V_m(\theta_v, t_k)$ to produce weighted subarray outputs $W^H V_m(\theta_v, t_k)$.

A magnitude squared processor 515 generates a subarray power series $P_m$ by squaring the magnitude of the weighted subarray power $P_m = W^H V_m V_m^H W = W^H C_m W$.

An averager 516 generates a weighted beam output $$P = \frac{1}{M} \sum_{m=1}^{M} P_m.$$

Beam power series P for each steering direction $\theta_v$ may be displayed on a display 350.

Alternatively, a second covariance estimate $\bar{C}'$ may be generated for reducing sensitivity to errors and for matching the rank of the rank-M covariance estimate to M stronger signals to mask unwanted weaker signals, wherein the second covariance estimate may include noise augmentation of diagonal components of the element covariance estimate substantially according to $$\bar{C}' = \bar{C} + f_n N \bar{P}_e I,$$

where $\bar{C}$ represents said rank-M element covariance estimate prior to noise augmentation, $\bar{P}_e$ represents element power averaged over said vector of element outputs, N represents the number of rows and columns of the covariance matrix, $f_n$ represents a numeric parameter to be chosen based on performance considerations, and I represents an identity matrix having dimension N. The second covariance estimate may be input to the adaptive processor to derive each of the adapted weight vectors substantially according to $$W = \frac{\bar{C}'^{-1} S}{S^H \bar{C}'^{-1} S}.$$

Alternatively, when the array of receiving elements is a periodic line array comprising a number of contiguous segments each having an equal number of elements, element covariance estimator 510 in FIG. 5 may generate a rank-M element covariance estimate for array segment p, substantially according to $$\bar{C}_p = \frac{1}{M} \sum_{m=0}^{M-1} C_{mp}$$

wherein $_{mp}$ represents an element output covariance of one subarray m for an array segment p substantially according to $$C_{mp} = V_{mp} B V_{mp}^H,$$

wherein $V_{mp}$ represents a vector of element outputs from time window processor 216 of subarray m for array segment p, $\bar{C}_p$ represents an average of each element output covariance summed over M subarrays, and $V_{mp}^H$ represents a Hermitian (conjugate) transpose of $V_{mp}$. Adaptive weight processor 512 may derive adapted weight vectors $W_p$ for each array segment p by minimizing output power $P_{MEp}(\theta_v)$ substantially according to $$P_{MEp} = W_p^H \bar{C}_p W_p,$$

subject to a constraint that signal gain for array segment p in a steering direction $\theta_v$ of a steering vector $S_p$ be unity substantially according to $$W_p^H S = 1,$$

such that $$W_p = \frac{\bar{C}_p^{-1} S_p}{S_p^H \bar{C}_p^{-1} S_p}.$$

The weaker signals are masked in spatially uncorrelated noise by the augmented diagonal of the beam covariance estimate. Vector multiplier 514 may combine adapted weight vectors $W_p$ taken in appropriate order into a single combined adapted weight vector and may combine the element outputs of all the array segments such that each inner product comprises a summed output of all the array segments combined coherently.

Alternatively, a second covariance estimate $\bar{C}'_p$ may be formed for reducing sensitivity to errors and for matching the rank of the rank-M covariance estimate to M stronger signals to mask unwanted weaker signals. The second element covariance estimate includes noise augmentation of diagonal components of the rank-M element covariance estimate substantially according to $$\bar{C}'_p = \bar{C}_p + f_n N \bar{P}_e I,$$

where $\bar{C}_p$ represents the rank-M element covariance estimate prior to noise augmentation, $\bar{P}_e$ represents element power averaged over the vector of element outputs, N represents the number of rows and columns of the covariance matrix, $f_n$ represents a numeric parameter to be chosen based on performance considerations, and I represents an identity matrix having a dimension N. The second element covariance estimate to the adaptive processor to derive each of said adapted weight vectors substantially according to $$W_p = \frac{\bar{C}_p'^{-1} S_p}{S_p^H \bar{C}_p'^{-1} S_p}.$$

The weaker signals are masked in spatially uncorrelated noise by the augmented diagonal of the beam covariance estimate.

Figure 6:
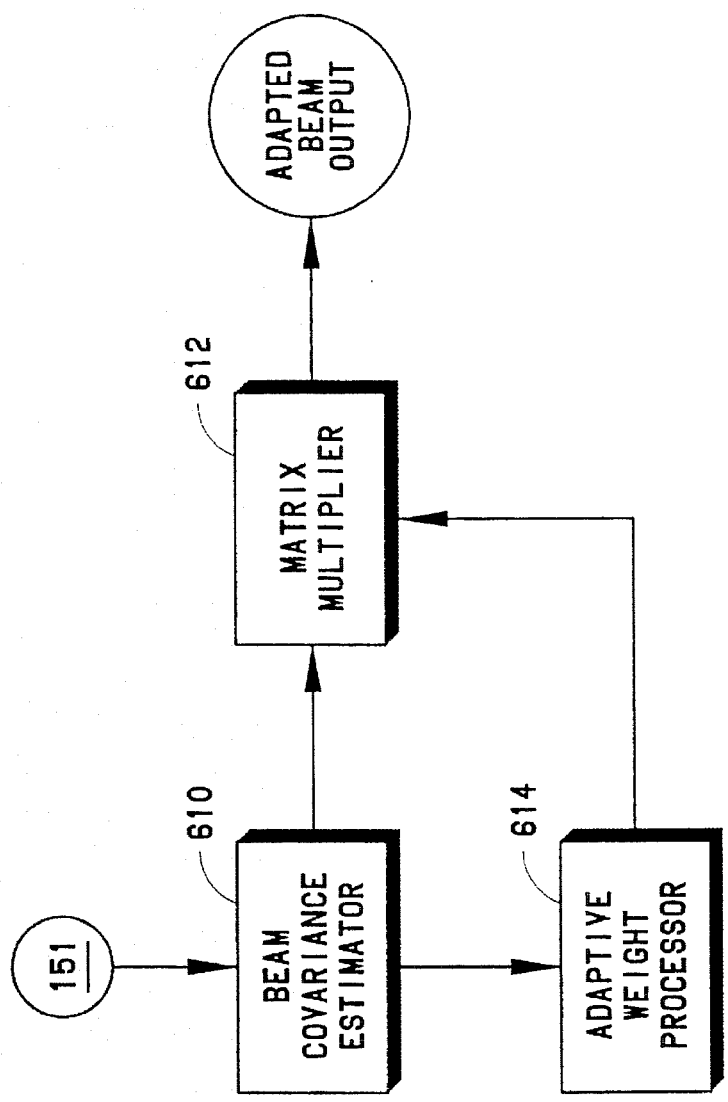
FIG. 6 is a block diagram of an adaptive beamformer of the present invention with beam covariance estimation.

Alternatively, a beam covariance estimate may be generated as shown in FIG. 6 by a beam covariance estimator 610, wherein for each N element subarray m, a beam covariance matrix $$B_m = b_m b_m^H$$

is formed, wherein $b_m$ represents a vector of phase-shifted summed beam outputs, the components of which are represented by $b_{mk} = B_{mk} S_m(\theta_k)$. $B_{mk}$ represents the summed beam output for subarray m and steering directin $\theta_k$, and $S_m(\theta_k)$ represents a steering component appropriate to the first element of subarray m and steering direction $\theta_k$. Beam covariance estimator 610 then averages the subarray beam covariances to form the average covariance $$\bar{B}_m = \frac{1}{M} \sum_{m=0}^{M-1} B_m.$$

An adaptive processor 614 may take the average beam covariance from beam covariance estimator 610 and produce an adaptive weight vector $$W = \frac{\bar{B}^{-1}D}{D^H \bar{B}^{-1} D}$$

for each steering direction $\theta_v$ by minimizing output power $P_{ME}(\theta_v)$ subject to a constraint $$W^H D = 1.$$

Beam direction vector D may be defined within the adaptive processor as a vector of beamformed responses to a unit plane-wave signal from a direction associated with steering vector S for each of the beam steering directions $\theta_v$ as $$D = F^H S,$$

wherein an appropriate beamforming matrix F the columns of which are the steering vectors for the directions represented in the beam covariance may transform the steering vector S corresponding to the direction for which the adapted power output is to be calculated.

A matrix multiplication processor 612 may take the output of covariance estimator 610 and adaptive processor 614 and form an adapted power output $$P_{ME} = W^H \bar{B} W.$$

Alternatively, a second covariance estimate $\bar{B}'$ may be formed for reducing sensitivity to errors and for matching the rank of the rank-M covariance estimate to M stronger signals to mask unwanted weaker signals. The second covariance estimate includes noise augmentation of diagonal components of the rank-M element covariance estimate substantially according to $$\bar{B}' = \bar{B} + f_n N \bar{P}_e I,$$

where $\bar{B}$ represents the rank-M element covariance estimate prior to noise augmentation, $\bar{P}_e$ represents element power averaged over the vector of element outputs, N represents the number of rows and columns of beam covariance matrix B, $f_n$ represents a numeric parameter to be chosen based on performance considerations, and I represents an identity matrix having a dimension N. The second covariance estimate may be input to the adaptive processor to derive each of the adapted weight vectors substantially according to $$W = \frac{\bar{B}'^{-1} D}{D^H \bar{B}'^{-1} D}.$$

The weaker signals are masked in spatially uncorrelated noise by the augmented diagonal of the beam covariance estimate.

While the embodiment described above incorporates minimum energy adaptive beamforming techniques found in the prior art, the novelty of the present invention lies in adapting local parameters to the target and interference field in the immediate vicinity of each time or range resolution cell processed without requiring time averaging. The adaptive algorithms described are exemplary, and may be replaced by many variants and alternate time domain adaptive beamforming techniques. For purposes of illustration, the exemplary adaptive algorithms are relatively straightforward, and do not include improvements that may be found in the literature.

A distinctive feature of the present invention is the ability to beamform multiple targets and interfering signals within a single time or range resolution cell with minimum signal suppression. This is accomplished by the "spatial smoothing algorithm" described in an article entitled "Adaptive Beamforming for Coherent Signals and Interference", *IEEE Transactions on Acoustics, Speech and Signal Processing*, Vol. ASSP-33, No. 3, June 1985 by Shan and Kailath. This article is incorporated herein by reference thereto. This spatial smoothing algorithm was developed to compensate for the effects of coherent multipath reception of passive signals, but is uniquely applied to active signals in the present invention.

In the method of the present invention, an echo E in FIG. 1 is received by line array 11 of receiving elements N from a target 14 at a range R. Target 14 is irradiated by a signal pulse P of bandwidth B transmitted from a position 13 near a first element 12 at a time t=0 for a duration T. Each element's output $f_n(t)$ is received over the element's total receiving time, from which time block element outputs $f'_n(t)$ are formed representing partially overlapped portions of $f_n(t)$. Each time block contains sufficient data to process a discrete time window extending from an arbitrary initial time $T_0$ to a final time $T_f$ after aligning the time blocks with respect to time difference for each steering direction. $T_f$ is preferably within T seconds of $T_0$, and a target observation time $T_n$ for any element within $T_f - T_0$ is defined such that the arrival time of an echo from range R is given by $t = T_0 + T_n$.

The method of the present invention further includes a replica correlation of the real time series $f_n(t)$ to generate a complex time series $C_n(t_k)$, and time shifting complex time series $C_n(t_k)$ to generate a complex time series $C_n'(t_k)$ for each of receiving elements N aligned with respect to time difference for each steering direction.

Additional methods may include adaptively beamforming complex time series $C_n'(t_k)$ for each of receiving elements N or first forming beam outputs from complex time series $C_n'(t_k)$ and then applying adaptive beamforming. In either case, the pre-processing of element outputs $C_n'(t_k)$ enables the adaptive beamforming to function more effectively by applying local parameters rather than parameters extracted from long averages. Such methods may include a spatial averaging technique as described above to generate adaptive weights from local parameters to minimize signal suppression.

While the method of the invention may be implemented by the various components described above, the invention may also be implemented by an appropriate program for a general purpose computer.

Other modifications, variations, and applications of the present invention may be made in accordance with the above teachings other than as specifically described to practice the invention within the scope of the following claims.

I claim:

1. A signal processor for processing an echo signal received by an array of receiving elements from a distant target ensonified or irradiated by a transmitted signal, comprising:

a receiver operably coupled to said array of receiving elements for receiving element outputs;

a digitizer operably coupled to said receiver for generating a digitized time series from each of said element outputs;

a block generator operably coupled to said digitizer for forming a series of uncompressed time blocks from said digitized time series within a total receiving time of said element outputs, wherein said uncompressed time blocks contain sufficient data to correlate and synchronize time segments from said digitized time series with a replica of said transmitted signal;

a replica correlator operably coupled to said block generator for correlating each of said uncompressed time blocks with said replica of said transmitted signal to form a series of correlated time blocks;

a time shifter operably coupled to said replica correlator for forming a series of synchronized groups from said series of correlated time blocks, wherein said synchronized groups are synchronized to within one sample period for each of a plurality of steering directions; and a time window generator operably coupled to said time shifter for forming a contiguous series of time windows from said series of synchronized groups, wherein each of said time windows extends from an initial time to a final time appropriate to an arrival time and a duration of said echo signal.

2. The signal processor of claim 1, further comprising:

a phase shifter operably coupled to said time shifter for phase shifting said time windows to form a phase-aligned time series, wherein said element outputs are further aligned with respect to phase to compensate for time shifts of less than one sample period; and a sum generator operably coupled to said phase shifter for forming a summed beam output from said phase-aligned time series for each of said steering directions.

3. The signal processor of claim 2, further comprising:

an estimator operably coupled to said time window generator for generating a covariance estimate for each of said time segments for each of said steering directions, and for averaging element output covariance samples from subarrays formed from said array of receiving elements to form said covariance estimate;

a weight adaptor operably coupled to said estimator for generating adapted weight vectors for said time segments, said weight vectors for suppressing interfering signals for each of said steering directions;

a vector multiplier operably coupled to said weight adaptor and to said time window generator for forming inner products of said adapted weight vectors with said element outputs from said subarrays for each of said time segments; and a magnitude squarer operably coupled to said vector multiplier, wherein said inner products are converted to adapted subarray outputs;

an averager operably coupled to said magnitude squarer, wherein said adapted subarray outputs are normalized and summed to form a weighted summed beam output, wherein interfering signals are suppressed for each of said steering directions for each of said time segments.

4. The signal processor of claim 3, wherein:

said receiving elements are formed into one of a periodic line array, a planar array, and a volumetric array, and are arranged such that said subarrays have substantially identical geometry;

said estimator includes a rank-M element covariance estimate generator for each of said time segments substantially according to $$\overline{C} = \frac{1}{M} \sum_{m=0}^{M-1} C_m,$$

wherein $C_m$ represents an element output covariance of a subarray m substantially according to $$C_m = V_m V_m^H,$$

wherein $V_m$ represents a vector of said element outputs of said subarray m, represents an average of each said element output covariance summed over M subarrays, and $V_m^H$ represents a Hermitian (conjugate) transpose of $V_m$; and said weight adaptor includes a weight generator for said adapted weight vectors W for each of said time segments, said weight generator minimizing output power $P_{ME}(\theta_v)$ substantially according to $$P_{ME} = W^H \overline{C} W,$$

subject to a constraint that signal gain in a steering direction $\theta_v$ of a steering vector S be unity substantially according to $$W_v^H S = 1,$$

such that $$W = \frac{\overline{C}^{-1} S}{S^H \overline{C}^{-1} S}$$

for each of said steering directions for each of said time segments of said time windows.

5. The signal processor of claim 3, wherein:

said array of receiving elements is a periodic line array;

said array of receiving elements comprises substantially contiguous array segments having a substantially equal number of elements;

said estimator includes a rank-M element covariance estimate generator for said time segments of for an array segment p, substantially according to $$\overline{C}_p = \frac{1}{M} \sum_{m=0}^{M-1} C_{mp},$$

wherein $C_{mp}$ represents an element output covariance of a subarray m for said array segment p substantially according to $$C_{mp} = V_{mp} B V_{mp}^H,$$

wherein $V_{mp}$ represents said vector of said element outputs of said subarray m for said array segment p, $\overline{C}_p$ represents an average of said element output covariance summed over M subarrays, and $V_{mp}^H$ represents a Hermitian (conjugate) transpose of $V_{mp}$;

said weight adaptor includes a weight generator for said adapted weight vectors $W_p$ for each of said time segments for said array segment p, said weight generator minimizing output power $P_{MEp}(q_v)$ substantially according to $$P_{MEp} = W_p^{Hp} \overline{C}_p W_p,$$

subject to a constraint that signal gain for said array segment p in a steering direction $q_v$ of a steering vector $S_p$ be unity substantially according to $$W_p^H S = 1,$$

such that $$W_p = \frac{\bar{C}_p^{-1} S_p}{S_p^H \bar{C}_p^{-1} S_p}$$

for each of said time segments for said array segment p; and said vector multiplier combines said adapted weight vectors $W_p$ taken in appropriate order into a single combined adapted weight vector and combines said element outputs for each of said array segments for each of said time segments such that each of said inner products comprises a summed output of at least one of said array segments combined coherently.

6. The signal processor of claim 2 further comprising:

a multiplier operably coupled to said summer for forming a phase-shifted summed beam output from said summed beam output to compensate for phase differences among subarrays of said array of receiving elements relative to each of said steering directions;

an estimator operably coupled to said multiplier for generating a covariance estimate for said phase-shifted summed beam output, and for averaging phase-shifted summed beam output covariance samples from said subarrays to form said covariance estimate;

a weight adaptor operably coupled to said estimator for generating adapted weight vectors for said time segments, said weight vectors for suppressing interfering signals for each of said steering directions; and a matrix multiplier operably coupled to said weight adaptor and to said estimator wherein said covariance estimate is multiplied by said adapted weight vectors and conjugate transposes of said adapted weight vectors in appropriate order to form an adapted beam output for each of said steering directions.

7. The signal processor of claim 6, wherein:

said array of receiving elements is formed into one of a line array, a planar array, a surface array and a volumetric array;

said receiving elements are arranged such that said subarrays have substantially identical geometry;

said estimator includes a rank-M element covariance estimate generator for said time segments substantially according to $$\bar{B}_m = \frac{1}{M} \sum_{m=0}^{M-1} B_m,$$

wherein $B_m$ represents a covariance of said phase-shifted summed beam output for a subarray m, substantially according to $$B_m = b_m b_m^H,$$

wherein $b_m$ represents a vector of said phase-shifted summed beam output having components represented by $b_{mk} = B_{mk} S_m(\theta_k)$, wherein $B_{mk}$ represents said phase-shifted summed beam output corresponding to said subarray m and said steering direction $\theta_k$, and $S_m(\theta_k)$ represents a steering component appropriate to a first element of said subarray m and said steering direction $\theta_k$;

said weight adaptor includes a transformer for a steering vector S defined for each of said steering directions into a beam direction vector D to define a vector of beamformed responses to a unit plane-wave signal substantially according to $$D = F^H S;$$

and said weight adaptor further includes a weight generator for adapted weight vectors W for each of said steering directions $\theta_v$, said weight generator minimizing output power $P_{ME}(\theta_v)$ of said element outputs substantially according to $$P_{ME} = W^H \bar{B} W,$$

subject to a constraint $$W^H D = 1$$

such that $$W = \frac{\bar{B}^{-1} D}{D^H \bar{B}^{-1} D}$$

for each of said steering directions for said time segments.

8. The signal processor of claim 4, wherein said transmitted signal is a sonar signal.

9. The signal processor of claim 5, wherein said transmitted signal is a sonar signal.

10. The signal processor of claim 7, wherein said transmitted signal is a sonar signal.

11. The signal processor of claim 4, wherein said rank-M element covariance estimate generator includes a second covariance generator operably coupled to said estimator for generating a second covariance estimate $\bar{C}'$ for reducing sensitivity to errors and for matching said rank-M covariance estimate by rank to M stronger signals to mask interfering signals, wherein said second covariance estimate includes noise augmentation of diagonal components of said rank-M element covariance estimate substantially according to $$\bar{C}' = \bar{C} + f_n N \bar{P}_e I,$$

where $\bar{C}$ represents said rank-M element covariance estimate prior to noise augmentation, $\bar{P}_e$ represents element power averaged over said vector of element outputs, N represents a dimension of said covariance matrix, $f_n$ represents a numeric parameter, and I represents an identity matrix having a dimension N, wherein said second covariance estimate is incorporated by said weight generator to derive each of said adapted weight vectors substantially according to $$W = \frac{\bar{C}'^{-1} S}{S^H \bar{C}'^{-1} S}.$$

12. The signal processor of claim 4, wherein said surface array is spherical.

13. The signal processor of claim 4, wherein said surface array is cylindrical.

14. The signal processor of claim 5, wherein said rank-M element covariance estimate generator includes a second element covariance generator operably coupled to said estimator for generating a second covariance estimate $\bar{C}'_{pn}$ for reducing sensitivity to errors and for matching said rank-M covariance estimate by rank to M stronger signals to mask interfering signals, wherein said second element covariance estimate includes noise augmentation of diagonal components of said rank-M element covariance estimate substantially according to $$C'_{pn} = \bar{C}_p + f_n N \bar{P}_e I,$$

where $\bar{C}_p$ represents said rank-M element covariance estimate prior to noise augmentation, $\bar{P}_e$ represents element power averaged over said vector of element outputs, N represents a dimension of said covariance matrix, $f_n$ represents a numeric parameter, and I represents an identity matrix having a dimension N, wherein said second element covariance estimate is incorporated by said weight adaptor to derive each of said adapted weight vectors substantially according to $$W_p = \frac{\bar{C}_p'^{-1} S_p}{S_p^H \bar{C}_p'^{-1} S_p}.$$

15. The signal processor of claim 7, wherein said rank-M beam covariance estimate generator includes a second covariance generator operably coupled to said estimator for generating a second covariance estimate $\bar{B}'$ for reducing sensitivity to errors and for matching said rank-M beam covariance estimate by rank to M stronger signals to mask interfering signals, wherein said second covariance estimate includes noise augmentation of diagonal components of said rank-M element covariance estimate substantially according to $$\bar{B}' = \bar{B} + f_n N \bar{P}_e I,$$

where $\bar{B}$ represents said rank-M beam covariance estimate prior to noise augmentation, $\bar{P}_e$ represents element power averaged over said vector of element outputs, N represents a dimension of said beam covariance matrix, $f_n$ represents a numeric parameter, and I represents an identity matrix having a dimension N, wherein said covariance estimate is incorporated by said weight adaptor to derive each of said adapted weight vectors substantially according to $$W = \frac{\bar{B}'^{-1} D}{D^H \bar{B}'^{-1} D}.$$

16. The signal processor of claim 7, wherein said surface array is spherical.

17. The signal processor of claim 7, wherein said surface array is cylindrical.

18. A method for processing an echo of a transmitted signal received by an array of receiving elements from a target at a range R ensonified or irradiated by a transmitted signal, comprising the steps of:

(a) receiving element outputs $f_n(t_k)$ as a digitized time series for forming time block element outputs $f_n(t_k)$ representing portions of said element outputs $f_n(t_k)$ containing sufficient data to correlate and synchronize a time segment having a duration T of said digitized time series with a replica of said transmitted signal;

(b) performing a replica correlation of said time block element outputs with a time series of digital samples of said replica of said transmitted signal to generate a series of correlated time blocks;

(c) time shifting said correlated time blocks to generate a series of synchronized groups, wherein each of said synchronized groups includes corresponding said correlated time blocks from said plurality of element outputs, synchronized to within one sample period for each of a plurality of steering directions; and (d) time windowing said synchronized groups to form a series of time-windowed groups having an initial time $T_0$ appropriate to an arrival time of said echo signal at said receiving array and a final time $T_f = T_0 + T$.

19. The method of claim 18, further comprising the steps of:

(a) phase shifting said time-windowed groups to generate a phase-aligned time series, wherein said element outputs are further aligned with respect to phase difference to compensate for time differences of less than one sample period for each of said steering directions; and (b) forming a summed beam output from said phase-aligned time series for each of said steering directions.

20. The method of claim 18, further comprising the steps of:

(a) generating a covariance estimate for each of said time-windowed groups for each of said steering directions by spatial averaging, wherein said spatial averaging includes averaging covariance samples from subarrays formed from said array of receiving elements;

(b) generating adapted weight vectors for each of said time-windowed groups for suppressing interfering signals for each of said steering directions;

(c) forming inner products of each of said adapted weight vectors with vectors of element outputs of said subarrays for each of said time segments;

(d) forming adapted subarray outputs from said inner products; and (e) forming a summed beam output as a complex time series of averages over said subarrays of said adapted subarray outputs, wherein said summed beam output suppresses interfering signals for each of said steering directions for each of said series of time-windowed groups.

21. The method of claim 20, wherein:

said step of generating a covariance estimate includes generating a rank-M covariance estimate substantially according to $$\bar{C} = \frac{1}{M} \sum_{m=0}^{M-1} C_m,$$

wherein $C_m$ represents an element covariance sample of a subarray m given by $$C_m = V_m V_m^H,$$

and wherein $V_m$ represents a vector of element outputs corresponding to one of said series of time-windowed groups for said subarray m, $\bar{C}$ represents an average of said element covariance samples over M subarrays, and $V_m^H$ represents a Hermitian (conjugate) transpose of $V_m$; and said step of generating a series of adapted weight vectors includes deriving adapted weight vectors W for each of said time segments, minimizing $P_{ME}(\theta_v)$ substantially according to $$P_{ME}(\theta_v) = W^H C W$$

subject to a constraint that signal gain in said steering direction $\theta_v$ associated with a steering vector S be unity substantially according to $$W^H S = 1,$$

such that $$W = \frac{\overline{C}^{-1}S}{S^H \overline{C}^{-1} S},$$

for each of said steering directions for each of said time segments.

22. The method of claim 20, wherein:
said step of generating a covariance estimate includes generating for each of said time segments a rank-M covariance estimate substantially according to $$\overline{C}_p = \frac{1}{M} \sum_{m=0}^{M-1} C_{mp},$$

wherein $C_{mp}$ represents an element covariance sample of a subarray m for an array segment p given by $$C_{mp} = V_{mp} B V_{mp}^H,$$

and wherein $V_{mp}$ represents said vector of element outputs corresponding to one of said series of time-windowed groups for said subarray m and said array segment p, $\overline{C}_p$ represents an average of said element covariance sample over M subarrays for said array segment p, and $V_{mp}^H$ represents a Hermitian (conjugate) transpose of $V_{mp}$; and
said step of generating a series of adapted weight vectors includes deriving adapted weight vectors $W_p$, for each of said time segments for said array segment p, minimizing $P_{MEP}(\theta_v)$ substantially according to $$P_{MEP} = W_p^H \overline{C}_p W_p,$$

subject to a constraint that signal gain in a steering direction $\theta_v$ associated with said steering vector $S_p$ be unity substantially according to $$W_p^H S = 1,$$

such that $$W_p = \frac{\overline{C}_p^{-1} S_p}{S_p^H \overline{C}_p^{-1} S_p},$$

for each of said steering directions.

23. The method of claim 19, further comprising:
(a) the step of phase shifting said summed beam outputs from subarrays formed from said array of receiving elements to form phase-shifted summed beam outputs, wherein said phase shifting compensates for phase differences among said subarrays relative to each of said steering directions;
(b) the step of forming a covariance estimate for said phase-shifted summed beam outputs, wherein said covariance estimate includes spatial averaging, wherein said spatial averaging includes averaging phase-shifted summed beam output covariance samples from said subarrays;
(c) the step of generating adapted weight vectors for each of said time-windowed groups for suppressing interfering signals for each of said steering directions;
(d) the step of matrix multiplying said covariance estimate by said weight vectors and conjugate transposes of said adapted weight vectors in appropriate order to form an adapted output for each of said steering directions.

24. The method of claim 23, wherein:
said step of generating a covariance estimate includes generating a beam covariance estimate substantially according to $$\overline{B}_m = \frac{1}{M} \sum_{m=0}^{M-1} B_m,$$

wherein $B_m$ represents a covariance of said phase-shifted summed beam outputs for a subarray m, substantially according to $$B_m = b_m b_m^H,$$

wherein $b_m$ represents a vector of said phase-shifted summed beam outputs having components represented by $b_{mk} = B_{mk} S_m(\theta_k)$, wherein $B_{mk}$ represents said summed beam output for said subarray m and a steering direction $\theta_k$, and $S_m(\theta_k)$ represents a steering component of a first element of said subarray and said steering direction $\theta_k$;
said step of generating adapted weight vectors includes the step of transforming a steering vector S defined by each of said steering directions into a beam direction vector D to define a vector of beamformed responses to a unit plane-wave signal from each of said steering directions substantially according to $$D = F^H S;$$

and said step of generating adapted weight vectors further includes deriving a series of adapted weight vectors W for each of said time segments, minimizing output power $P_{ME}(\theta_v)$ substantially according to $$P_{ME} = W^H \overline{B} W,$$

subject to a constraint $$W^D = 1$$

such that $$W = \frac{\overline{B}^{-1} D}{D^H \overline{B}^{-1} D},$$

for each of said steering directions.

25. The method of claim 21, wherein said step of generating a rank-M covariance estimate includes a further step of generating a second covariance estimate for reducing sensitivity to errors and for matching said rank of said covariance estimate for masking interfering signals from M stronger signals, wherein said second covariance estimate includes augmentation of the diagonal components of said covariance estimate substantially according to $$C' = \overline{C} + f_n N \overline{P}_e I,$$

where $\overline{C}$ represents an average covariance prior to augmentation, $\overline{P}_e$ represents element power averaged over said vector of element outputs, N represents a dimension of said covariance matrix, $f_n$ represents a numeric parameter, and I represents an identity matrix of dimension N, wherein said second covariance estimate is incorporated in said step of generating a series of adapted weight vectors to derive said adapted weight vectors substantially according to $$W = \frac{\overline{C}^{-1}S}{S^H\overline{C}^{-1}S}.$$

26. The method of claim 22, wherein said step of generating a rank-M covariance estimate includes a further step of generating a second covariance estimate for reducing sensitivity to errors and for matching said rank of said covariance estimate for masking interfering signals from M stronger signals, wherein said second covariance estimate includes augmentation of the diagonal components of said covariance estimate substantially according to $$\overline{C}'_p = \overline{C}_p + f_n N \overline{P}_e I,$$

where $\overline{C}_p$ represents an average covariance prior to augmentation, $\overline{P}_e$ represents element power averaged over said vector of element outputs, N represents a dimension of said covariance matrix, $f_n$ represents a numeric parameter, and I represents an identity matrix of dimension N, wherein said second covariance estimate is incorporated in said step of generating a series of adapted weight vectors to derive said adapted weight vectors substantially according to $$W_p = \frac{\overline{C}_p'^{-1}S_p}{S_p^H \overline{C}_p'^{-1}S_p}.$$

27. The method of claim 24, wherein said step of generating a rank-M covariance estimate includes a further step of generating a second covariance estimate for reducing sensitivity to errors and for matching said rank of said covariance estimate for masking interfering signals from M stronger signals, wherein said second covariance estimate includes augmentation of the diagonal components of said covariance estimate substantially according to $$B' = \overline{B} + f_n N \overline{P}_e I,$$

where $\overline{B}$ represents an average covariance prior to augmentation, represents element power averaged over said vector of element outputs, N represents a dimension of said covariance matrix, $f_n$ represents a numeric parameter, and I represents an identity matrix of dimension N, and wherein said second covariance estimate is incorporated in said step of generating a series of adapted weight vectors to derive said adapted weight vectors substantially according to $$W = \frac{B'^{-1}D}{D^H B'^{-1} D}.$$

* * * * *